United States Patent Office 3,532,646
Patented Oct. 6, 1970

3,532,646
PIPERAZINE-CONTAINING POLYMERS
Paul Antikow, Lucien Bonnard, and Bernard Lamure, Lyon, France, assignors to Societe Rhodiaceta, Paris, France, a French body corporate
No Drawing. Continuation of application Ser. No. 556,904, June 13, 1966. This application Feb. 17, 1969, Ser. No. 805,096
Claims priority, application France, June 24, 1965, 22,146
Int. Cl. C08g 33/06
U.S. Cl. 260—2    6 Claims

ABSTRACT OF THE DISCLOSURE

Nitrogen containing polymers containing structural recovering units of formula:

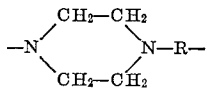

in which R is a $C_3$ to $C_{12}$ polymethylene radical, cyclohexylene, or m- or p-phenylene, are made by polycondensation at above 250° C. of an N,N'-bis-β-hydroxyethyl diamine of formula $$HO \cdot CH_2 \cdot CH_2 \cdot NH \cdot R \cdot NH \cdot CH_2 \cdot CH_2 \cdot OH$$

Polymers of molecular weight below 1000 can be made, and are viscous liquids or low melting solids. Polymers of medium or high (fibre-forming) molecular weight can also be made. The high molecular weight polymers can be melt spun.

---

This application is a continuation of our application Ser. No. 556,904 filed June 13, 1966, now abandoned.

The present invention relates to new nitrogen-containing polymers comprising piperazine rings attached to the macro-molecular chain by the nitrogen atoms, and their production and use.

In one aspect the invention consists in polymers which consist essentially of recurring units of the formula:

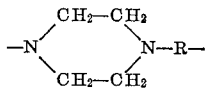

in which R is a divalent aliphatic hydrocarbon radical containing at least 3 carbon atoms, or a divalent aromatic or cyclanic hydrocarbon radical. As examples of radicals R there may be mentioned the tri-, tetra-, penta, and hexamethylene, cyclohexylene, and m- and p-phenylene radicals.

These polymers have infra-red spectra, which include characteristic bands corresponding to those of a N,N'-disubstituted piperazine ring at 7.5µ, 7.6µ, and 7.8µ, 7.9µ, and densities between 1.3 and 1.5 g./cm.³.

The physical properties of these polymers and the forms they may take depend on the degree of polymerisation, i.e. the molecular weight. With degrees of polymerisation of 4 to 5 or slightly more, i.e. generally with molecular weights up to about 1000, the products are viscous liquids at ambient temperature or solids having a melting point below 150° C. They are colourless, and are soluble or undergo considerable swelling in alcohols, o-chlorophenol, pyridine and the chlorinated solvents. The higher polymers have higher melting points, and may be converted into filaments or films, for example by the melt method.

From the polymers of low molecular weight (below 1000) it is possible to obtain polymers of medium molecular weight, e.g. of 1000 to 4000, which are solid at ambient temperature, and take the form of gelatinous masses at high temperature. They are infusible, and decompose when strongly heated in air, and they have little or no solubility in the majority of the usual organic solvents. These products of medium molecular weight may be converted into products of high molecular weight which are solids, generally of a pale yellow or brownish-red colour, and which withstand temperatures above 360° C. without melting.

According to another aspect of the invention the above polymers are prepared by polycondensation of N,N'-bis-β-hydroxyethylated diamines. This polycondensation involves ring-forming dehydration in accordance with the following equation:

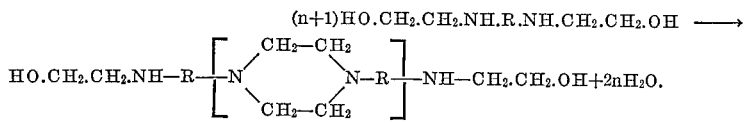

The reaction can be carried out by heating the monomer in an inert atmosphere, preferably in the presence of a catalyst, at a temperature above 250° C. If no catalyst is used it becomes necessary to heat to temperatures of about 300° C. or higher to start the reaction, and the polymerisation only proceeds at a normal rate at temperatures at which the polymer suffers thermal degradation as it is formed.

The catalysts which prove most active for increasing the speed of reaction are phosphoric acid, pyrophosphoric acid, iodine, aluminum chloride and boron phosphate. Amounts of about 0.01% to 1% by weight (calculated on the monomer) are generally sufficient. Other dehydration catalysts may be employed if desired.

The reaction can be effected in a liquid reaction medium which is a solvent or diluent for the monomer, e.g. decahydronaphthalene, but it is preferred to carry out the reaction in bulk in an inert atmosphere, generally nitrogen.

When the polycondensation is carried out in bulk, it is found that the product passes through two quite distinct phases. In a first stage, the viscosity of the reaction mass gradually increases; the water of condensation escapes from the mass in the form of bubbles and distills off. When the degree of condensation reaches about 4, the increase in viscosity becomes much more rapid. As the reaction continues, it is found that solidification points appear, which extend rapidly to the whole reaction mass. The latter is then in the form of a product of cellular structure, occupying a very much greater volume than the starting reactants, and having a low apparent density which may be about 0.1 to 0.3 g./cm.³. In the second stage, the reaction takes place in the solid phase.

When the polycondensation is carried out in the absence of solvent, but with the monomer in the form of a thin layer, the film obtained is compact and has a non-cellular structure.

To obtain polymers of low or medium molecular weight, it is unnecessary to operate under a high vacuum, or even under reduced pressure, and for reasons of economy and simplicity of apparatus it is preferable to operate at normal pressure, especially as loss of monomer by distillation is thus avoided to the maximum extent. However when polymers of high molecular weight are to be made, it is preferable to terminate the reaction under a pressure below 0.5 mm. Hg and at a temperature above 300° C. This post-polycondensation under reduced pressure may optionally be carried out on shaped objects consisting of polymers of low molecular weight.

The process according to the invention is not applicable to aliphatic N,N'-bis-β-hydroxyethylated diamines

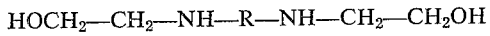

in which R contains less than 3 carbon atoms and in particular to N,N'-bis-(β-hydroxyethyl)ethylenediamine, because in this case it is found that, on heating, a mixture of water and a product identified as hydroxyethylpiperazine distills off. The latter is formed by a reaction peculiar to N,N-bis-(β-hydroxyethyl)ethylenediamine in which hydroxyethylpiperazine is formed.

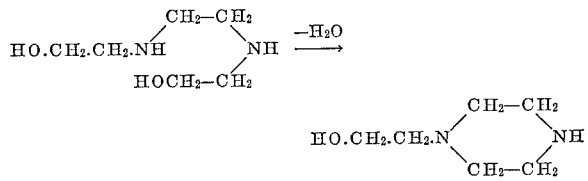

The quantity of hydroxyethylpiperazine which may be isolated from the distillate does not correspond to the whole of the N,N'-bis-(β-hydroxyethyl)ethylenediamine employed, and a solid product is also obtained, but its empirical formula does not correspond to a polyethylene piperazine.

The N,N' - bis-(β-hydroxyethylated)diamines which may be employed to prepare the polymers according to the present invention are obtained by condensing aliphatic, cyclanic or aromatic diamines with ethylene oxide in a mole ratio between 1:1.5 and 1:4, preferably by heating at a temperature between 50° and 250° C., optionally in the presence of a catalyst for reactions of this type, under normal pressure or superatmospheric pressure.

The following examples illustrate the invention.

EXAMPLE 1

N,N' - bis - (β-hydroxyethyl)dodecamethylenediamine is prepared by reacting in an autoclave for 10 minutes at 150° C.:

1 mol. of 1,12-dodecamethylenediamine
1.5 mol. of ethylene oxide.

The disubstituted diamine is purified by distillation and then has a boiling point of 207° C./0.12 mm. Hg.

Into a 250 ml. round-bottomed flask provided with a nitrogen supply pipe and surmounted by a distillation column followed by a condenser are introduced 28.8 g. of the N,N'-bis-(β-hydroxyethyl) dodecamethylenediamine and 0.05 g. of pyrophosphoric acid. On heating to 260° C., the reaction starts and it continues at this temperature. Water distills off and the viscosity of the mass slowly increases. The heating is stopped when about 70% of the theoretical quantity of water corresponding to a complete condensation has been distilled off.

On cooling the mass, there is obtained a translucent white product which softens between 100° and 120° C., has a density of 1.45 g./cm.³, and is soluble in o-chlorophenol.

The molecular weight determined by titration of the terminal groupings is about 800. The elementary analysis is in agreement with the formula, and the infra-red spectrum with the structure of a polyalkyl piperazine:

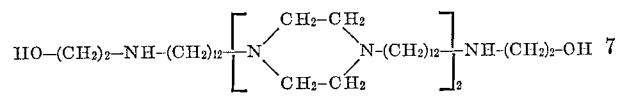

If heating of this polymeric product is continued, still under a nitrogen atmosphere and at 260° C., a plastic and spongy mass is obtained, which has an apparent density of 0.35 g./cm.³. This mass cannot be dissolved by o-chlorophenol, but is simply swollen. Although its physical properties are very different, it has the same general formula and the same infra-red spectrum as the product of low molecular weight.

When heated for 4 hours under normal nitrogen pressure, this mass hardens, and when heated under a pressure of 0.3 mm. Hg at 310° C. for 3 hours, it yields an infusible product, which has a slight yellow colouration and an apparent density of 0.14 g./cm.³.

When compressed and heated at about 380° C., this product gives a compact homogeneous mass which can be worked with cutting tools.

EXAMPLE 2

By reacting 1.5 mol. of m-phenylenediamine
3 mol. of ethylene oxide at 120–150° C. in the presence of ethanol, N,N'-bis-(β-hydroxyethyl)-m-phenylenediamine is prepared, which has a boiling point of 211° C. under 0.1 mm. Hg after distillation.

Into a 600 ml. polymerisation reactor having a cover and provided with a stirrer, a temperature gauge and a nitrogen supply pipe, and surmounted by a distillation column followed by a condenser, are introduced 65.3 g. of the N,N'-bis-(β-hydroxyethyl)-m-phenylenediamine and 0.65 g. of orthophosphoric acid.

The mixture is heated with stirring and under normal nitrogen pressure, and dehydration commences at 250° C. The heating is stopped when about 70% of the theoretical quantity of water corresponding to a complete condensation has distilled off. On cooling the mass to 20° C., a translucent white product is obtained which can be hot-shaped by extrusion or by moulding.

The infra-red spectrum agrees with the structure

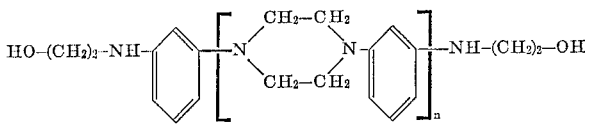

If heating of this product is continued at 250° C. in an inert atmosphere, a brownish-red solid mass forms, which is infusible at 360° C.

EXAMPLE 3

By reacting 2 mol. of 1,4-transcyclohexanediamine, and
3 mol. of ethylene oxide at 110–120° C., there is prepared N,N'-bis-(β-hydroxyethyl)-1,4-diaminocyclohexane, which has a melting point of 188° C. at 0.3 mm. Hg after distillation.

Into an apparatus identical to that employed in Example 2 are introduced 64 g. of the N,N'-bis-(β-hydroxyethyl)-1,4-diaminocyclohexane and 0.10 g. of boron phosphate. Heating at 260° C. under normal nitrogen pressure results in dehydration and polycondensation. The reaction is stopped when 65% of the theoretical quantity of water corresponding to complete condensation has distilled.

A mass is obtained which is viscous at elevated temperature and solid at ambient temperature and which has no distinct melting point, but a softening zone which begins at about 70° C. This mass is soluble in the cold in o-chlorophenol and at elevated temperature in pyridine. Its infra-red spectrum comprises characteristic bands consistent with the presence of piperazine rings, and bands corresponding to the terminal hydroxyl groups.

The post-polycondensation of this mass by heating for 3 hours at 300° C. under a pressure of 4 mm. Hg. results in the formation of a hard and brittle block; this is a product of having a slight brown colouration, on which no melting point is observed. It is insoluble in the cold and at elevated temperature in o-chlorophenol and pyridine. Its infra-red spectrum is similar to that of the product of low molecular weight and indicates a clear reduction of the terminal groups: the bands at 3.0μ and 9.5μ corresponding to the hydroxyl groups being weak.

EXAMPLE 4

By reacting 1 mol. of hexamethylenediamine, and
2 mol. of ethylene oxide at 90–95° C. in the presence of water, N,N'-bis-(β-hydroxyethyl)hexamethylenediamine is prepared, which has a melting point of 191° C. under 3 mm. Hg. after distillation.

Into an apparatus identical to that of Example 1 are introduced 12.2 g. of the N,N'-bis-(β-hydroxyethyl) hexamethylenediamine and 0.2 ml. of phosphoric acid. On heating at 250–300° C. under a nitrogen atmosphere, there is formed at the end of 30 minutes an infusible mass which is solid in the cold but plastic under pressure. The quantity of water eliminated at this stage is 72% of the theoretical quantity corresponding to complete condensation; this corresponds to a molecular weight for the polymer of about 600.

This mass is insoluble in toluene and dioxane, but swells appreciably in dimethylformamide and o-chlorophenol.

We claim:

1. Process for the production of polymers consisting essentially of recurring structural units of the formula:

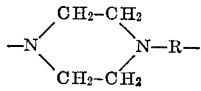

in which R is a divalent hydrocarbon radical selected from the group which consists of polymethylene radicals containing 3–12 carbon atoms, cyclohexylene, and m- and p-phenylene, which comprises heating an N,N'-bis-β-hydroxyethyl diamine of formula

HO.CH$_2$.CH$_2$.NH.R.NH.CH$_2$.CH$_2$.OH in an inert atmosphere at a temperature above 250° C. until polycondensation has occurred.

2. Process according to claim 1, wherein R is selected from the group which consists of the tri-, tetra-, penta, hexa- and dodeca-methylene radicals.

3. Process according to claim 1, wherein the diamine is heated with a dehydration catalyst.

4. Process according to claim 3, wherein the catalyst is selected from the group which consists of orthophosphoric acid, pyrophosphoric acid, iodine, aluminum chloride and boron phosphate.

5. Process according to claim 1, wherein the last stage of the polycondensation is effected at a temperature above 300° C. under a pressure below 0.5 mm. Hg.

6. Process according to claim 4, wherein the last stage of the polycondensation is effected at a temperature above 300° C. under a pressure below 0.5 mm. Hg.

References Cited

UNITED STATES PATENTS

| | | | |
|---|---|---|---|
| 2,639,284 | 5/1953 | Morren | 260—268 |
| 3,165,482 | 1/1965 | Hall | 260—2 |
| 3,207,707 | 9/1965 | Klebe | 260—2 |
| 3,363,030 | 1/1968 | Cantatore | 260—2 |
| 3,370,048 | 2/1968 | Reynolds | 260—2 |

SAMUEL H. BLECH, Primary Examiner

U.S. Cl. X.R.

260—2.5, 30.2, 32.6, 33.4, 268, 563, 573, 584